(12) United States Patent
Muterspaw

(10) Patent No.: US 7,753,594 B2
(45) Date of Patent: Jul. 13, 2010

(54) RETAINING PLUG FOR RETAINING NEEDLE ROLLER BEARINGS IN THE CENTERS OF GEARS

(75) Inventor: Raymond E. Muterspaw, Warren, MI (US)

(73) Assignee: Acutech Industries, Inc., Rochester Hills, MI (US)

( * ) Notice: Subject to any disclaimer, the term of this patent is extended or adjusted under 35 U.S.C. 154(b) by 494 days.

(21) Appl. No.: 11/899,466

(22) Filed: Sep. 6, 2007

(65) Prior Publication Data

US 2009/0067762 A1    Mar. 12, 2009

(51) Int. Cl.
*F16C 41/04*    (2006.01)
*B65D 85/58*    (2006.01)

(52) U.S. Cl. ........................ 384/448; 206/318
(58) Field of Classification Search .................. 384/448; 206/318
See application file for complete search history.

(56) References Cited

U.S. PATENT DOCUMENTS

| 2,215,134 | A | * | 9/1940 | Rehnberg | .................... 206/318 |
| 2,639,498 | A | | 5/1953 | Rookstool | |
| 2,860,406 | A | | 11/1958 | Reichardt | |
| 3,259,962 | A | | 7/1966 | Taylor | |
| 3,345,723 | A | | 10/1967 | Stilla et al. | |
| 4,166,660 | A | | 9/1979 | Murphy | |
| 4,398,777 | A | * | 8/1983 | Murphy | ...................... 384/448 |
| 4,596,472 | A | | 6/1986 | Vezirian | |
| 5,184,402 | A | * | 2/1993 | Kadokawa | ............... 29/898.07 |
| 6,568,859 | B1 | | 5/2003 | Stegmeier | |
| 7,673,390 | B2 | * | 3/2010 | Hasiak et al. | ............ 29/898.06 |

FOREIGN PATENT DOCUMENTS

JP         58196839 A  * 11/1983
JP         2002155963     5/2002

* cited by examiner

*Primary Examiner*—Thomas R Hannon
(74) *Attorney, Agent, or Firm*—Dykema Gossett PLLC

(57) ABSTRACT

The retaining plus is used for assembling or retaining an array of needle roller bearings in the center of a gear. The plug applies a spring force through a push ball and a wire retainer clip which separates a pair of the needle roller bearings and force the array of bearings together and against the inside diameter of the gear.

13 Claims, 3 Drawing Sheets

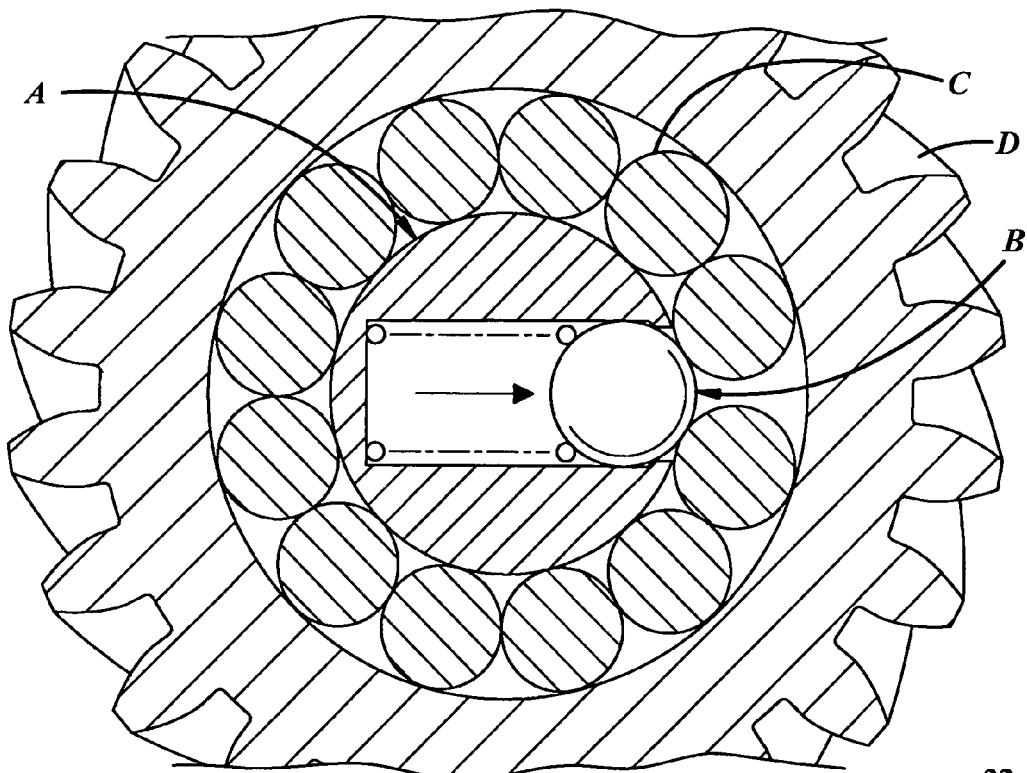
(Prior Art)
FIG. 1
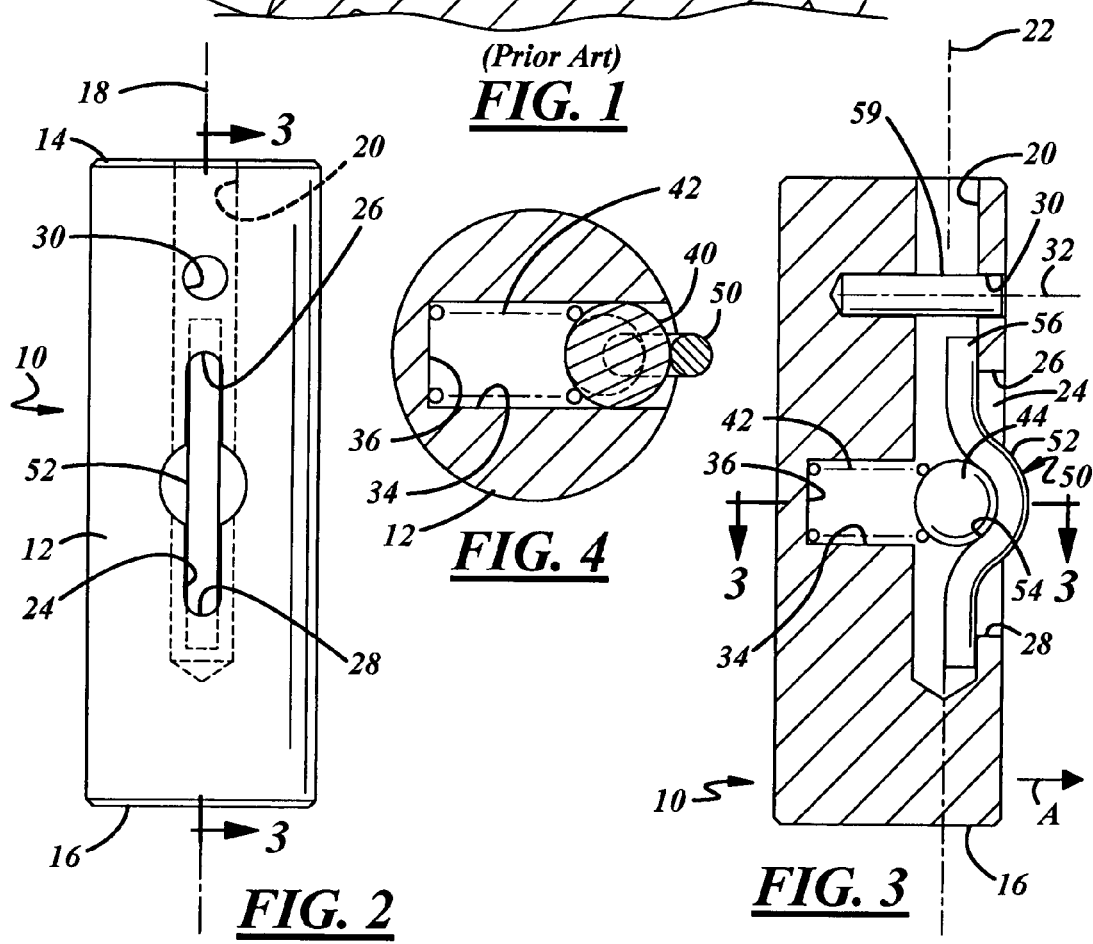
FIG. 2  FIG. 4  FIG. 3

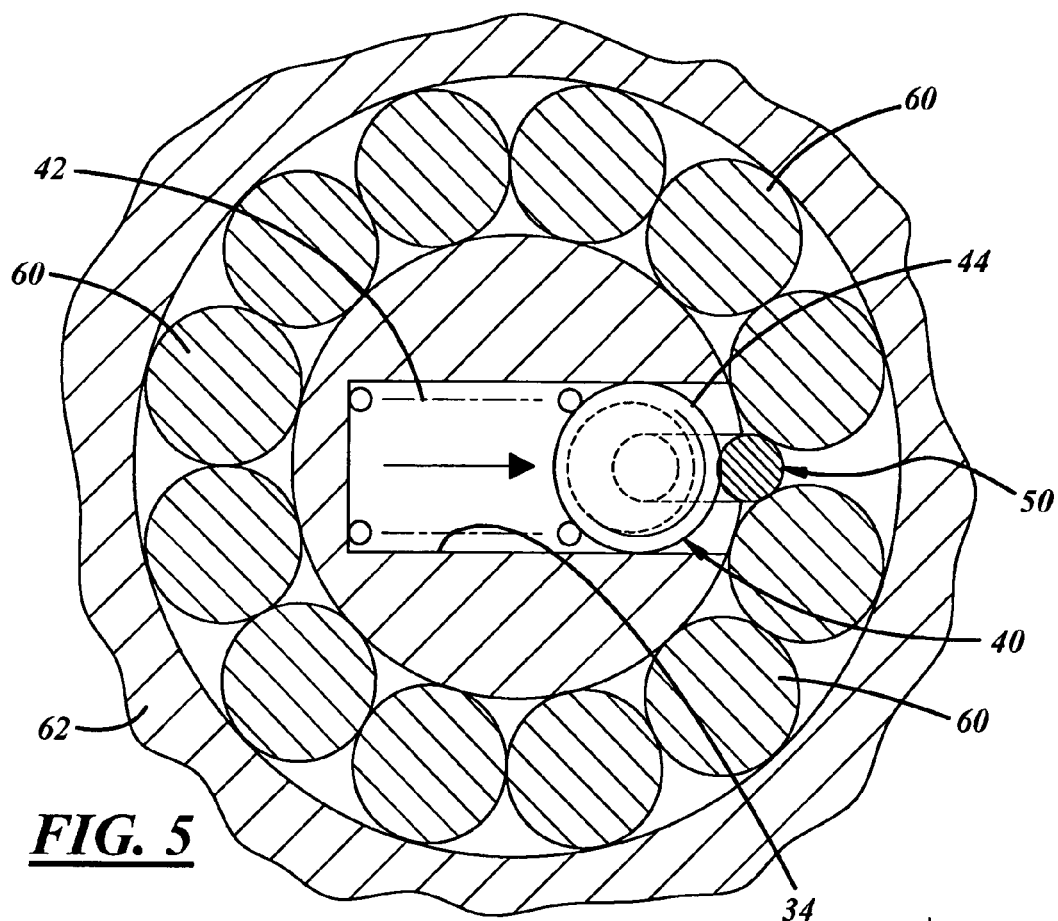
*FIG. 5*
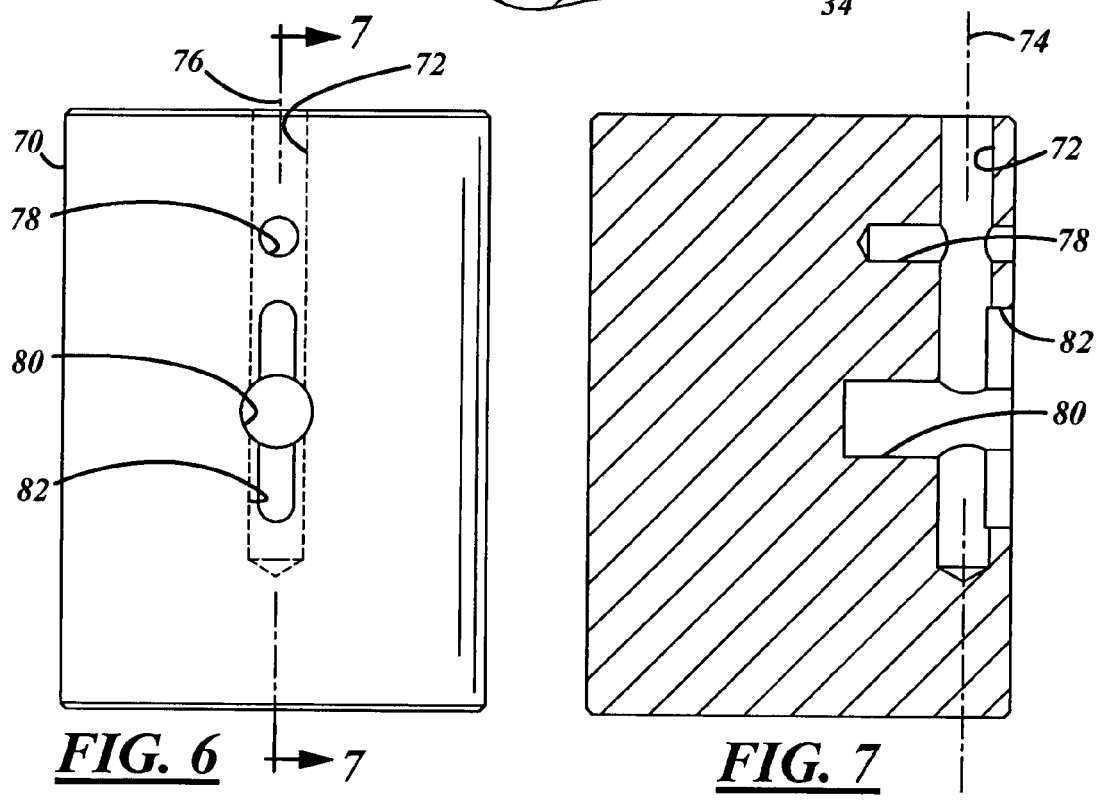
*FIG. 6*    *FIG. 7*

RETAINING PLUG FOR RETAINING NEEDLE ROLLER BEARINGS IN THE CENTERS OF GEARS

BACKGROUND OF THE INVENTION

1. Field of the Invention

The present invention relates to a retaining plug for assembling or retaining needle roller bearings in the centers of gears. This is achieved by applying a spring force through a push ball and a retaining wire, to separate two of the needle roller bearings and force them against each other and against the inside diameter of the gear.

2. Description of the Prior Art

The prior art retaining plug of FIG. 1 included a cylindrical body having a spring biased and ball detent located in a cavity of the body midway between the ends thereof. The spring biases the ball outwardly against a pair of roller bearings. In use what happens is that the sides of the ball detent would get crushed which would prevent the ball from coming out far enough to retain the needles. Thus, after two or three uses of the prior art plug, they would tip the needle bearings and all of the needle bearings would fall out.

Other devices of the prior art includes Japanese Pat. No. JP02002155963A, entitled, "Device for Preventing Fall-Off of Needle from Needle Bearing in its Assembling", having a publication date of May 31, 2002. It discloses a device for preventing fall-off of a needle from a needle bearing in its assembling, having a construction by which even if a temporary shaft in an assembling process of the needle bearing is removed, the needle is maintained without falling off, and a permanent shaft can be inserted.

Japanese Pat. No. JP358196939 A., entitled, "Method for Arranging Balls Uniformly and its Device", was published Nov. 16, 1983. The device arranges balls uniformly by applying an axial load to an inner wheel after inserting balls between the inner and outer wheels. A needle is inserted in sequence in the gap around the balls between the inner and outer wheels thereby arranging the balls uniformly when assembling a ball bearing.

U.S. Pat. No. 2,639,498 (Rookstool) entitled, "Bearing Insert Removing and applying Tool", issued May 26, 1953, relates to a tool for removing and/or applying the bearing insert for the bearings of a shaft.

U.S. Pat. No. 2,860,406 (Reichardt) entitled, "Roller Bearing Retaining Means", issued Nov. 18, 1958 illustrates a roller assembly and another roller retention mechanism which is relatively expensive when compared with the present invention. A dummy tubular plug is employed which enters somewhat loosely inside the circular arrangement of the rollers. The plug has two radially bored holes, offset axially, and possibly circumferentially one from the other. There is a formed wire clip which must be entered inside the bore of the tubular plug and the two bent ends fitted radially outward through the bored holes. A resilient rubber-like plug is located inside the bore of the tubular plug to hold the wire clip in place. Thus, this three-piece roller retaining assembly appears to be relatively expensive to manufacture and has to be reused to be feasible. This creates additional expenses for collecting, handling, shipping, storing and cleaning the roller retention mechanism.

U.S. Pat. No. 3,259,962 (Taylor) entitled, "Method of Assembling Bearing Elements, issued Jul. 12, 1966, relates to a method of assembling bearing balls or equivalent roller bearing elements between inner and outer, coaxially and radially spaced bearing members. The method includes the assembly of a circumferential series of bearing members between race surfaces, one of which is machined or fixedly formed upon a part which is journaled by the assembled bearing structure, for example, an elongated worm of a steering mechanism. The worm, in turn, is approximately sustained in a relatively fixed axial relation of its interval race surface to that of the co-acting, radially spaced race surface of a structure in which the end of the worm is axially received.

U.S. Pat. No. 3,345,723 (Stilla et al.) entitled, "Dummy Pin Means and Method for Assembling Needle Bearings", issued Oct. 10, 1967. It includes a simple form of dummy pin which may be used not only for the assembly of needle or roller bearings having a single roll set, but also for bearing arrangements involving double sets of rolls, with an axially interposed spacer sleeve or collar. The pin further can be arranged to cooperate with the spacer so that it is impossible to assemble a part without inclusion of the spacer.

U.S. Pat. No. 4,166,660 (Murphy) entitled, "Roller Assembly with Roller Retention Spring", issued Sep. 4, 1979. It discloses a folded spring which extends relatively diametrically across the circle of rollers in a roller assembly with each diametrical side pressing between two adjoining rollers to wedge these rollers apart circumferentially and thus depress all of the rollers against the wall of the bore in a "keystoning" effect with sufficient force to prevent axial movement of the rollers and to radially retain the rollers in the body. The spring may be removed from the body after shipment, preferably by a simple axial push.

U.S. Pat. No. 4,596,472 (Vezirian) entitled, "Thrust Bearing and Axial Retainer System for Rotary Cone Rock Bits and Method for Assembling Same", issued Jun. 24, 1986. It discloses a retention and thrust bearing system for retaining and locating a rotary rock cutter cone upon a journal shaft supported by a rock bit body. The cone is rotatively supported on the cooperating journal shaft by plain friction roller bearings.

U.S. Pat. No. 6,568,859 (Stegmeier) entitled, "Bearing Support", issued May 27, 2003. It relates to a rotating shaft bearing mounting structure and, in particular, to a bearing support for facilitating removal and replacement of a bearing and for supporting the rotatable shaft while the bearing is removed from the shaft.

The retaining plug, according to the present invention, substantially departs from the conventional concepts and designs of the prior art, and in so doing, provides a tool primarily developed for the purpose of facilitating insertion of and for retaining the needle roller bearings in the centers of gears by the application of a spring force through the push ball of a detent and the accompanying retaining wire. This separates two of the needle rollers and force them against each other and against the inside diameter of the gear.

SUMMARY OF THE INVENTION

In view of the disadvantages inherent with the prior art retaining plugs and tools for arranging ball bearings and devices, the present invention provides a new retaining plug developed for use in a process for retaining the needle roller bearings into the center a of gear.

To attain this, a feature of the invention comprises a retaining plug having a body with a longitudinal axis and an outer surface. A longitudinal passage is located in the body at one side of the longitudinal axis and is open at one end. A slot is located in the outer surface of the body and a cavity is located in the body having an axis perpendicular to the longitudinal axis. A transverse passage is located in the body parallel to and spaced from the axis of the cavity. A spring and ball detent is located in the cavity. A wire retainer clip with a pair of ends is located in the longitudinal passage and is provided with a curved intermediate portion which extends through the slot. The ends of the retainer clip are located in the longitudinal passage and the ball of the spring and ball detent engages the curved portion of the retainer clip and biases same outwardly.

Another feature of the present invention is to provide a retaining plug of the aforementioned type wherein the body is cylindrical and the longitudinal passage, cavity and transverse passage, are each of circular cross section.

Still another feature of the present invention is to provide a retaining plug of the aforementioned type wherein the slot is in the form of a rectangle and through which the curved portion of the retainer clip extends.

A further feature of the present invention is to provide a retaining plug of the aforementioned type wherein a retaining plug of the aforementioned type wherein the wire retainer clip is made exclusively from wire of circular cross section.

A still further feature of the present invention is to provide a retaining plug of the aforementioned type wherein a cylindrical body is provided having a longitudinal center axis and an outer cylindrical surface. A pair of longitudinal passages are located in the body at opposite ends thereof at one side of the center axis. The passages are opposed to one another and each passage is open at one end thereof, with the opposite end being closed. The longitudinal passages have a common longitudinal axis which is parallel to the longitudinal center axis of the cylindrical body.

Another feature of the present invention is to provide a retaining plug of the aforementioned type wherein there is a pair of slots in the cylindrical surface of the body, with the slots being longitudinally aligned and spaced apart and overlying the longitudinal passages. With such construction the cylindrical body is provided with a pair of cavities, each cavity having an axis perpendicular to the longitudinal axis with the corresponding passage. Each of the longitudinal passages has a transverse passage in the body parallel to and spaced from the axis of the corresponding cavity.

Still another feature of the present invention is to provide a retaining plug of the aforementioned type wherein each cavity is provided with a spring and ball detent and a longitudinal wire retainer clip, with a pair of ends located in the corresponding longitudinal passage. Each retainer clip has an intermediate curved portion which extends through the corresponding slot in the cylindrical body. With such construction, the ends of the wire retainer clips are retained in the longitudinal passage by cylindrical roll pins which are provided in the transverse passages.

There has thus been outlined, rather broadly, the more important features of the invention in order that the detailed description thereof that follows may be understood, and in order that the present contributions to the art may be better appreciated. There are additional features of the invention that will be described hereinafter and will form the subject matter of the claims appended hereto.

Before explaining at least one embodiment of the invention in detail, it is to be understood that the invention is not limited in its application to the details of and to the arrangements of the components set forth in the following description or illustrated in the drawings. The invention is capable of other embodiments and of being practiced and carried in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for designing of other structures, methods and systems for carrying out the several purposes of the invention. It is important, therefore, that the claims be regarded as including such equivalent constructions in so far as they do not depart from the spirit and scope of the present invention.

The objects and various features of novelty which characterize the invention are pointed out with particularity in the claims annexed to and forming a part of this disclosure. For a better understanding of the invention, its operating advantages and its specific features and objects attained by its uses, reference should be made to the accompanying drawings and descriptive matter in which there are illustrated preferred embodiments of the invention.

BRIEF DESCRIPTION OF THE DRAWINGS

FIG. 1 is a fragmentary cross sectional view of a prior art tool used to retain bearings in the center of a gear.

FIG. 2 is an elevational view of the novel retaining plug of the present invention.

FIG. 3 is a cross sectional view taken on the line 3-3 of FIG. 2.

FIG. 4 is a cross sectional view taken on the line 4-4 of FIG. 3.

FIG. 5 is a fragmentary cross sectional view illustrating the novel retaining plug of the present invention being utilized for retaining the needle roller bearings in the center of a gear as a result of applying a spring force through the push ball and retaining wire to separate two of the needle rollers and force them against each other and against the inside diameter of the gear.

FIG. 6 is an elevational view of the cylindrical body of the novel retaining plug.

FIG. 7 is a cross sectional view taken on the line 7-7 of FIG. 6.

DETAILED DESCRIPTION OF THE PREFERRED EMBODIMENT

Figure 8:
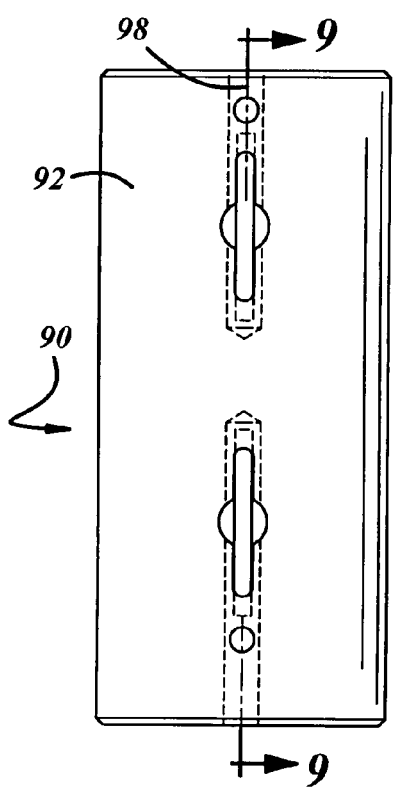
FIG. 8 is an elevational view of another embodiment of the present invention.

Automotive manufacturers depend on needle bearing injection systems for faster and more reliable assembly. The preferred system is made by Letnan Industries, Inc. of Sterling Heights, Mich. 48314, and may include an apparatus of the type illustrated and described in U.S. Pat. No. 4,837,910, issued Jun. 13, 1989, entitled, "Method and Apparatus for Assembling Anti-Friction Bearings". This system collects and assembles a discrete number of needle bearings in an annular array into a part such as a gear utilizing positive displacement and a serpentine track. The loose bearings are retained, as an example, by temporary steel retaining plugs while transporting to final assembly. The retaining plug of the present invention is also a temporary plug and is meant to replace the plugs now in use with the Letnan Industries' needle bearing injection systems.

As mentioned previously, FIG. 1 illustrates a prior art temporary plug A, having a cavity with a spring biased ball detent B engaging a pair of needle ball bearings C forming a part of a discreet number of needle bearings C as assembled in an annular array in the center of a gear D. The ball of the detent B wears out rather rapidly and cannot effectively hold the two adjacent needle bearings apart and against the inside diameter of the gear.

Referring now to the drawings, the novel temporary retaining of process plug is designated by the numeral 10, FIGS. 2-4 inclusive. It consists of a generally cylindrical elongated body 12 having the ends provided with upper and lower chamfers 14 and 16. The body 12 has a longitudinal center axis 18. The body 12 has a longitudinal passage of circular cross section designated by the numeral 20. The passage 20 has a longitudinal axis 22 which is parallel to the center axis 18 of the body 12. The passage 20 enters through the top end 14 and terminates a short distance from the bottom 16 as shown in FIG. 3. The body 14 is provided with a slot 24 of a generally rectangular cross section. The upper and lower ends 26 and 28 of slot 24 are curved as shown in FIG. 1. The slot 24 intersects the longitudinal passage 20. A transverse passage 30 having a transverse axis 32 is provided in the cylindrical body 12. A generally centrally located cavity 34 is provided in the body 12. The back surface 36 of the cavity 34 is closed while the front surface is opened and intersects the passage 20 as best illustrated in FIG. 3.

The body 12 is provided with a detent 40 consisting of a spring 42 and a spherical ball 44. In order to overcome the problems of the prior art, a wire retaining clip 50, formed by a single piece of wire of circular cross section, is provided to cooperate with the ball 44 of the ball detent 40 as illustrated in FIG. 3. The wire clip 50 has a curved intermediate portion 52 which on the inside thereof has a surface 54 which seats the ball 44. As a result, the spring 42 and the ball 44 of the detent 40 urge the wire 50 outwardly in the direction of arrow A of FIG. 3. With the present invention, there are provided three passages, 20, 30 and 34, with the spring and ball detent 40 located in the cavity 34. The spring wire 50 is first inserted into passage 20 through the slot 24 with the upper end 56 thereof inserted first. After the upper end 56 is inserted behind the slot 24, then the lower end 58 of the wire 50 is inserted. The wire clip 50 is then held in place by means of the cylindrical dowel pin 59 which extends into passage 30. With such a construction, the ball 44 seats in the curved portion 52 of the wire clip 50. Thereafter, the wire clip 50 is locked in place by the roll pin 60 which is inserted through the passage 30 as shown in FIG. 6. The roll pin 60 traps the wire retainer 50 in place.

The novel temporary retaining plug 10 as described in connection with FIGS. 2-4 inclusive is illustrated in FIG. 5 where it is employed in a needle bearing injection system of the type manufactured by Letnan Industries, Inc. The system collects and assembles a discrete number of needle bearings 60 in an annual array in a gear 62. The loose bearings 60 are retained by the temporary retainer plug 10 when transporting the gear 62 to final assembly. The retaining plug 10 is a temporary plug and replaces the plugs now in use with the Letnan Industries needle injection systems:

It should be noted that the spherical ball 44 of the retaining plug 10 does not contact the bearings 60; rather, the wire or clip spring 50 is urged in between the pair of adjacent needle bearings 60 as illustrated in FIG. 5 and urges the bearings 60 against one another and against the inside diameter of the gear 62. With this device, the ball 44 of detent 40 does not wear as rapidly as the prior art device and can effectively, with the assistance of the wire spring 50 separate the pair of adjacent bearings 60 and urge the bearings 60 against the inside surface of the gear or part 62.

The retaining plug 10 may be made in various sizes, with different diameters, lengths, and widths. Each elongated body may have anywhere from three passages and one slot, as described in connection with FIGS. 2-4 inclusive or six passages and two slots as described in connection with FIGS. 8 and 9. This embodiment consists of a single body with two detents. With a retaining plug having triple detents, there would be nine passages and three slots, while a plug having quadruple detents would have twelve passage and four slots.

Continuing on with FIGS. 6 and 7, there is illustrated a different sized body for a plug utilizing a single detent. It is slightly shorter than the body of FIG. 3 and is approximately twice the diameter of the plug of FIG. 3. The body 70 contains three passages, namely a longitudinal passage 72 having a longitudinal axis 74 which is parallel to the center longitudinal axis 76 of the body 70. It further includes a transverse passage 78 and a recess or cavity 80 which receives the spring and ball of the detent. The wall of the body 70 is provided with an elongated slot 82. The body 80 is designed to receive a ball detent, a dowel pin, and a wire spring or clip in generally the same manner as described in FIGS. 1-3 inclusive.

Figure 9:
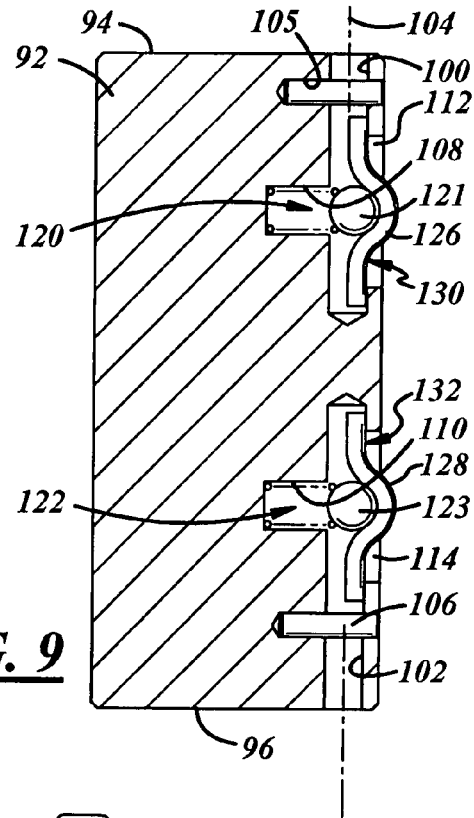
FIG. 9 is a cross sectional view taken on the line 9-9 of FIG. 8.
Figure 10:
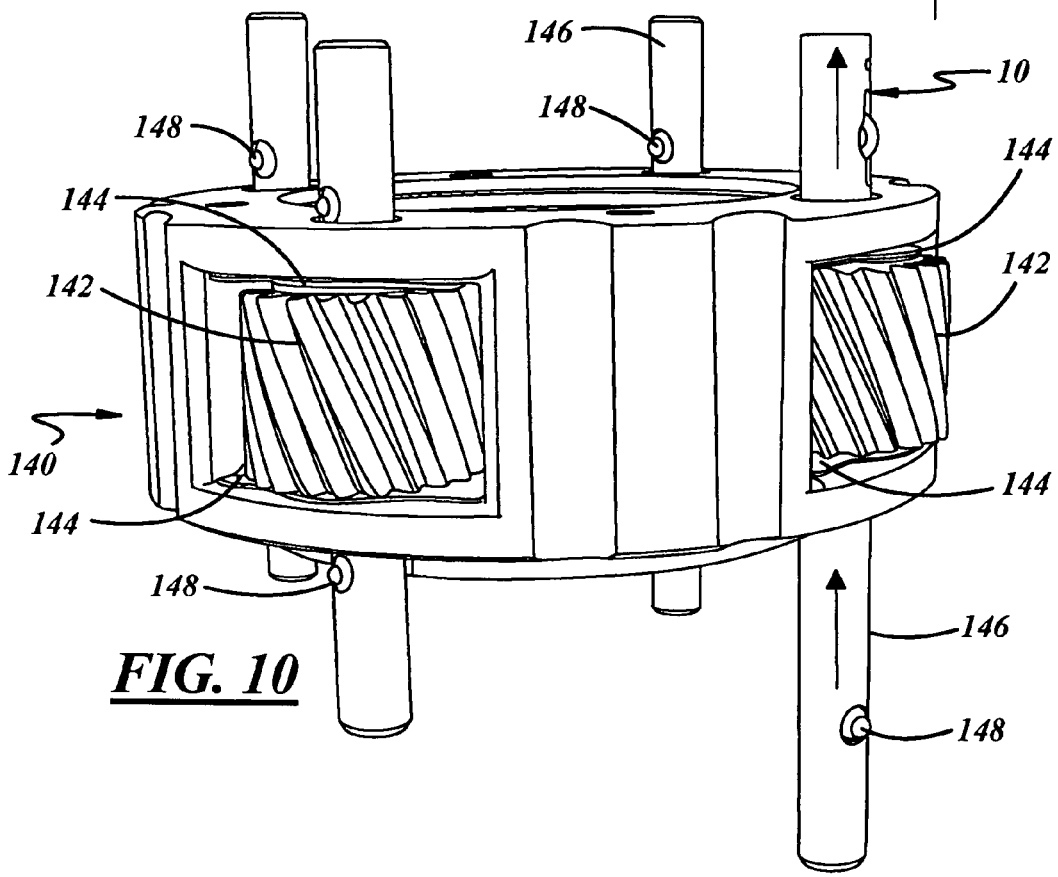
FIG. 10 is a perspective view of a mechanism employing a plurality of gears, with a permanent shaft being shown in one instance of pushing and removing the temporary retaining plug of the present invention from the gear for its subsequent reuse.

A further embodiment of the present invention is illustrated in FIGS. 8 and 9, where the plug 90 is provided with two detents. Plug 90 contains a body 92 containing double the number of passages and slots as does the embodiment of FIGS. 2-4 inclusive. The body 92 has a chamfered top surface 94 and a chamfered bottom surface 96. The body 92 has a center axis 98 and a pair of longitudinal passage 100 and 102 having a common longitudinal axis 104. The passages 100 and 102 are spaced apart near the center of the body 92. Each passage 100, 102 has a transverse passage 105, 106, a cavity or passage 108 and 110 and longitudinally aligned and spaced apart slots 112 and 114. The spring and ball detents 120 and 122 are received in the corresponding cavities 108 and 110. The ball 121, 123 of each detent is seated in the curved center portion 126, 128 of the wire clip 130 and 132, respectively. The ball of each detent urges the curved portion of the wire clips 126, 128 to the right as viewed in FIG. 9. Dowel pins 134 and 131 traps the corresponding wire clips in their respective longitudinal passages behind the corresponding slot. The roll pins 134 and 136 trap the wire clips 130, 132 in place.

A carrier 140 carrying a plurality of needle bearing assemblies or gears 142 are mounted in the carrier 140. Washers 144 are placed on opposite sides of each gear 142. A secondary process plug 146 having upper and lower detents 148 is inserted into the carrier 140 to remove the temporary retaining plug 10 from the carrier 140. The upper and lower detents 148 retain the corresponding gears in the carrier 140. Subsequently the assembled gear and carrier 140 are moved to a further processing operation where the carrier and gear assembly 140 is mounted on an axle, not shown. The retaining plugs 10 which are removed from the carrier 140 are subsequently re-used.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resort to, falling within the scope of the invention.

What I claim is:

1. A retaining plug comprising:
   (a) a body having a longitudinal axis and an outer surface;
   (b) a longitudinal passage in said body at one side of said axis and opened at one end;
   (c) a slot in the outer surface of said body;
   (d) a cavity in said body having an axis perpendicular to said longitudinal axis;
   (e) a transverse passage in said body parallel to and spaced from the axis of said cavity;
   (f) a spring and ball detent located in said cavity;
   (g) a wire retainer clip with a pair of ends located in said longitudinal passage and having a curved intermediate portion extending through said slot;
   (h) the ends of said retainer clip being located in said longitudinal passage; and
   (i) the ball of said spring and ball detent engaging the curved portion of said retainer clip and biasing same outwardly.

2. The retaining plug of claim 1, wherein said body is cylindrical.

3. The retaining plug of claim 2, wherein said longitudinal passage, said cavity and said transverse passage are each of circular cross-section.

4. The retaining plug of claim 3, wherein a roll pin is located in said transverse passage to hold said wire retainer clip in said longitudinal passage.

5. The retaining plug of claim 1, wherein said slot is in the form of a rectangle and through which said curved portion of said retainer clip extends.

6. The retaining plug of claim 1, wherein said wire retainer clip is made from wire having a circular cross-section.

7. A retaining plug comprising:
   (a) a cylindrical body having a longitudinal center axis and an outer cylindrical surface;
   (b) a longitudinal passage in said body at one side of said center axis and opened at one end;
   (c) a generally rectangular slot in the cylindrical surface of said body;
   (d) a cavity in said body having an axis perpendicular to said longitudinal center axis;
   (e) a transverse passage in said body intersecting said longitudinal passage and being parallel to and spaced from the axis of said cavity;
   (f) a spring and ball detent located in said cavity;
   (g) a retainer clip made from wire of circular cross-section with a pair of ends located in said longitudinal passage and having an intermediate curved portion extending through said slot;
   (h) the ends of said retainer clip being located in said longitudinal passage behind said slot; and
   (i) the ball of said spring and ball detent engaging the curved portion of said retainer clip and biasing same said detent outwardly through said slot.

8. The retaining plug of claim 7, wherein said longitudinal passage, said cavity and said transverse passage are each of circular cross-section.

9. The retaining plug of claim 8, wherein a cylindrical roll pin is located in said transverse passage to hold said wire retainer clip in said longitudinal passage.

10. A retaining plug comprising:
    (a) a cylindrical body having a longitudinal center axis and an outer cylindrical surface;
    (b) a pair of longitudinal passages in said body at opposite ends thereof and at one side of said center axis, said passages being opposed to one another and each passage being open at one end thereof, with the opposite ends being spaced apart; said longitudinal passages having a longitudinal axis which is parallel to said longitudinal center axis of said body;
    (c) a pair of slots in said cylindrical surface of said body, said slots being longitudinally aligned and spaced apart and overlying said longitudinal passages;
    (d) said cylindrical body having a pair of cavities, each cavity having an axis perpendicular to the longitudinal axis of the corresponding passage;
    (e) each of said longitudinal passages having a transverse passage in said body parallel to and spaced from the axis of the corresponding cavity;
    (f) each cavity having a spring and ball detent located therein;
    (g) each longitudinal passage having a wire retainer clip with a pair of ends located in the corresponding longitudinal passage and having an intermediate curved portion extending through the corresponding slot;
    (h) the ends of each of said wire retainer clip being anchored to the corresponding longitudinal passage; and
    (i) the ball of each of said spring and ball detent engaging the curved portion of said retainer clip and resulting in the detent biasing same outwardly through said slot.

11. The retaining plug of claim 10, wherein said longitudinal passages said cavities and said transverse passages are each of circular cross-section.

12. The retaining plug of claim 10, wherein each retainer clip is made from wire having a circular cross-section.

13. The retaining plug of claim 10, wherein each transverse passage is provided with a cylindrical roll pin to retain the wire retainer clip in the corresponding longitudinal passage.

* * * * *